(12) United States Patent
Park et al.

(10) Patent No.: US 12,132,173 B2
(45) Date of Patent: Oct. 29, 2024

(54) SECONDARY BATTERY

(71) Applicant: LG Chem, Ltd., Seoul (KR)

(72) Inventors: Jung Il Park, Daejeon (KR); Jee Ho Kim, Daejeon (KR); Yong Tae Lee, Daejeon (KR); Myung Hoon Ko, Daejeon (KR); Ki Youn Kim, Daejeon (KR); Gyung Soo Kang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 777 days.

(21) Appl. No.: 17/282,127

(22) PCT Filed: Oct. 1, 2019

(86) PCT No.: PCT/KR2019/012790
§ 371 (c)(1),
(2) Date: Apr. 1, 2021

(87) PCT Pub. No.: WO2020/071718
PCT Pub. Date: Apr. 9, 2020

(65) Prior Publication Data
US 2021/0376392 A1    Dec. 2, 2021

(30) Foreign Application Priority Data
Oct. 5, 2018  (KR) .......................... 10-2018-0118989

(51) Int. Cl.
*H01M 10/0587*    (2010.01)
*H01M 10/04*    (2006.01)
(Continued)

(52) U.S. Cl.
CPC ... *H01M 10/0587* (2013.01); *H01M 10/0431* (2013.01); *H01M 50/107* (2021.01);
(Continued)

(58) Field of Classification Search
CPC ........... H01M 10/0587; H01M 50/107; H01M 50/538; H01M 50/536; H01M 10/0431; H01M 50/10
(Continued)

(56) References Cited

U.S. PATENT DOCUMENTS 5,521,021 A    5/1996  Alexandres et al.
2004/0247999 A1    12/2004  Shirane et al.
(Continued)

FOREIGN PATENT DOCUMENTS

CN    1694287 A    11/2005
CN    103262288 A    8/2013
(Continued)

OTHER PUBLICATIONS

English language machine translation of "Battery, Battery Pack and their Manufacturing Methods" in JP2005276814 (A)—Oct. 6, 2005 by Shimizu Shintaro et al. (Year: 2005).*
(Continued)

*Primary Examiner* — Jonathan G Jelsma
*Assistant Examiner* — Omar M Kekia
(74) *Attorney, Agent, or Firm* — Lerner David LLP

(57) ABSTRACT

A secondary battery comprises an electrode assembly including a first electrode, a separator, and a second electrode alternately stacked and wound about a central axis. A first non-coating portion that is not coated with an electrode active material protrudes farther than the separator in a first direction along the central axis and a second non-coating portion that is not coated with the electrode active material protrudes farther than the separator in a second, opposite direction along the central axis. The first non-coating portion contacts a first connection part disposed on an end of a first can of the battery, and the second non-coating portion contacts a second connection part disposed on an end of a
(Continued)

second can. At least one of the first connection part or the second connection part comprises a protrusion having a shape protruding towards the electrode assembly.

16 Claims, 13 Drawing Sheets

(51) Int. Cl.
    *H01M 50/107*     (2021.01)
    *H01M 50/536*     (2021.01)
    *H01M 50/538*     (2021.01)
    *H01M 50/10*     (2021.01)

(52) U.S. Cl.
    CPC ....... *H01M 50/536* (2021.01); *H01M 50/538* (2021.01); *H01M 50/10* (2021.01)

(58) Field of Classification Search
    USPC .......................................................... 429/94
    See application file for complete search history.

(56) References Cited

U.S. PATENT DOCUMENTS

| | | |
|---|---|---|
| 2005/0158620 A1 | 7/2005 | Kim et al. |
| 2005/0277020 A1* | 12/2005 | Cheon ................. H01M 50/538 429/176 |
| 2007/0190407 A1* | 8/2007 | Fujikawa ............... H01M 50/46 429/174 |
| 2012/0015224 A1 | 1/2012 | Pytlik et al. |
| 2013/0130066 A1 | 5/2013 | Pytlik et al. |
| 2014/0004399 A1 | 1/2014 | Kim et al. |
| 2015/0243938 A1 | 8/2015 | Kim et al. |
| 2016/0126598 A1 | 5/2016 | Lee et al. |
| 2016/0141561 A1 | 5/2016 | Watanabe et al. |
| 2016/0141736 A1 | 5/2016 | Hong et al. |
| 2016/0260997 A1 | 9/2016 | Lee et al. |

FOREIGN PATENT DOCUMENTS

| | | | | |
|---|---|---|---|---|
| CN | 103477490 A | | 12/2013 | |
| CN | 105340118 A | | 2/2016 | |
| JP | 2002170546 A | | 6/2002 | |
| JP | 2003123846 A | | 4/2003 | |
| JP | 2005276814 | * | 10/2005 | ............ Y02E 60/10 |
| JP | 2005322649 A | | 11/2005 | |
| JP | 4347259 B2 | | 10/2009 | |
| JP | 2015527723 A | | 9/2015 | |
| JP | 2016100122 A | | 5/2016 | |
| KR | 20050075889 A | | 7/2005 | |
| KR | 20050106539 A | | 11/2005 | |
| KR | 20110124269 A | | 11/2011 | |
| KR | 101374849 B1 | | 3/2014 | |
| KR | 20150143030 A | | 12/2015 | |
| KR | 20160010121 A | | 1/2016 | |
| KR | 20160107416 A | | 9/2016 | |

OTHER PUBLICATIONS

Search Report dated Jun. 9, 2023 from the Office Action for Chinese Application No. 201980063146.1 issued Jun. 14, 2023, pp. 1-3. [See pp. 1-2, categorizing the cited references].
International Search Report for Application No. PCT/KR2019/012790 dated Jan. 13, 2020, 3 pages.
Extended European Search Report including Written Opinion for Application No. 19868366.6 dated Dec. 15, 2021, pp. 1-7.

* cited by examiner

SECONDARY BATTERY

CROSS-REFERENCE TO RELATED APPLICATIONS

The present application is a national phase entry under 35 U.S.C. § 371 of International Application No. PCT/KR2019/012790 filed Oct. 1, 2019, which claims the benefit of the priority of Korean Patent Application No. 10-2018-0118989, filed on Oct. 5, 2018, which is hereby incorporated by reference in its entirety.

TECHNICAL FIELD

The present invention relate to a secondary battery.

BACKGROUND ART

Secondary batteries are rechargeable, unlike primarily batteries, and also they are very capable of compact size and high capacity. Thus, recently, many studies on secondary batteries have been carried out. As technology development and demands for mobile devices increase, the demands for secondary batteries as energy sources are rapidly increasing.

Secondary batteries are classified into coin type cells, cylindrical type cells, prismatic type cells, and pouch type cells according to a shape of a battery case. In such a secondary battery, an electrode assembly mounted in a battery case is a chargeable and dischargeable power generating device having a structure in which an electrode and a separator are stacked.

The electrode assembly may be generally classified into a jelly-roll type electrode assembly, a stacked type electrode assembly, and a stack/folding type electrode assembly. In a jelly-roll type electrode assembly, a separator is interposed between a positive electrode and a negative electrode, each of which is provided as the form of a sheet coated with an active material, and then, the positive electrode, the separator, and the negative electrode are wound. In a stacked type electrode assembly, a plurality of positive and negative electrodes with a separator therebetween are sequentially stacked. In a stack/folding type electrode assembly, stacked type unit cells are wound together with a separation film having a long length. Among them, the jelly-roll type electrode assembly is widely used because the jelly-roll type electrode assembly has advantages in ease of manufacturing and high energy density per weight.

DISCLOSURE OF THE INVENTION

Technical Problem

One aspect of the present invention is to provide a secondary battery which has minimum resistance and improved heat dissipation characteristics.

In addition, another aspect of the present invention is to provide a secondary battery regardless of any meandering of a wound electrode when a can and the electrode are welded to each other.

Furthermore, another aspect of the present invention is to provide a secondary battery in which electrode resistance and thermal deviation are capable of being improved.

Technical Solution

A secondary battery according to an embodiment of the present invention comprises an electrode assembly in which a first electrode, a separator, and a second electrode are alternately stacked, and a can configured to accommodate the electrode assembly, wherein the first electrode is disposed on an end of the electrode assembly in one direction so that a first electrode non-coating portion that is not coated with an electrode active material protrudes more than the separator with respect to a direction of a winding center axis of the electrode assembly, the second is disposed on an end of the electrode assembly in the other direction so that a second electrode non-coating portion that is not coated with the electrode active material protrudes more than the separator with respect to the direction of the winding center axis of the electrode assembly, the can comprises a first can and a second can, the first electrode non-coating portion contacts a first connection part disposed on an end of one side of the first can, and the second electrode non-coating portion contacts a second connection part disposed on an end of the other side of the second can, and at least one of the first connection part or the second connection part comprises a protrusion connection part having a shape protruding in a direction of the electrode assembly.

Advantageous Effects

According to the present invention, the electrode of the wound electrode assembly may be directly connected to the can without a connection member to minimize resistance and improve the heat dissipation characteristics.

Also, according to the present invention, the protrusion connection part protruding toward the electrode assembly may be formed on the can so that the welding between the electrode non-coating portion of the electrode assembly and the can is performed regardless of any meandering of the wound electrode.

Furthermore, according to the present invention, the welding position and the welding pattern between the can and the electrode non-coating portion may be uniformly formed to improve the electrode resistance and the thermal deviation.

MODE FOR CARRYING OUT THE INVENTION

Figure 1:
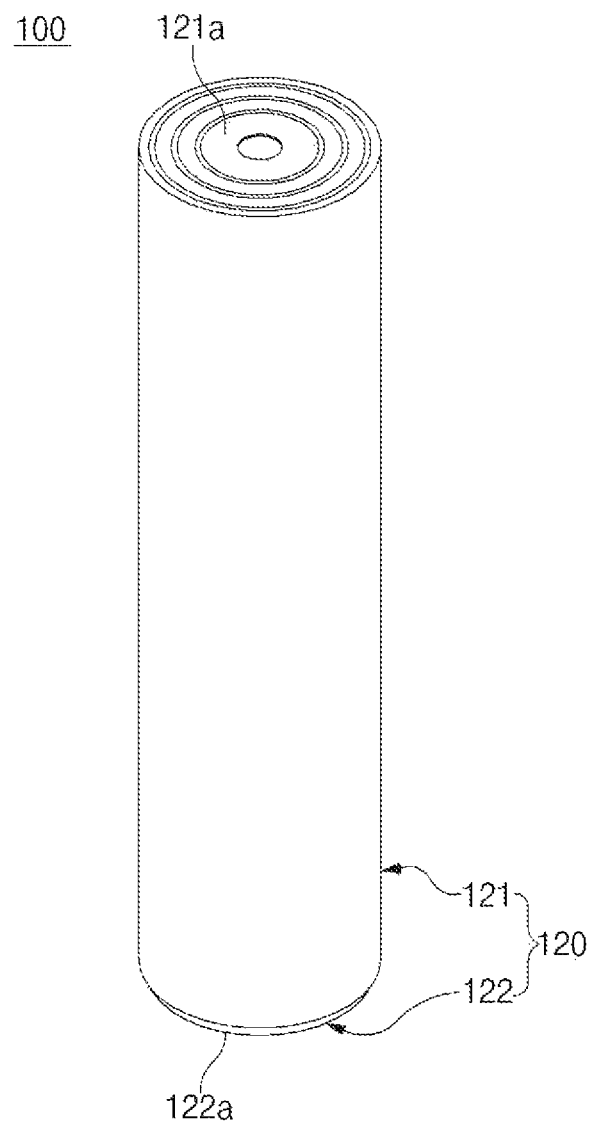
FIG. 1 is a perspective view of a secondary battery according to a first embodiment of the present invention.

The objectives, specific advantages, and novel features of the present invention will become more apparent from the following detailed description taken in conjunction with the accompanying drawings. It should be noted that the reference numerals are added to the components of the drawings in the present specification with consistent numerals as much as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
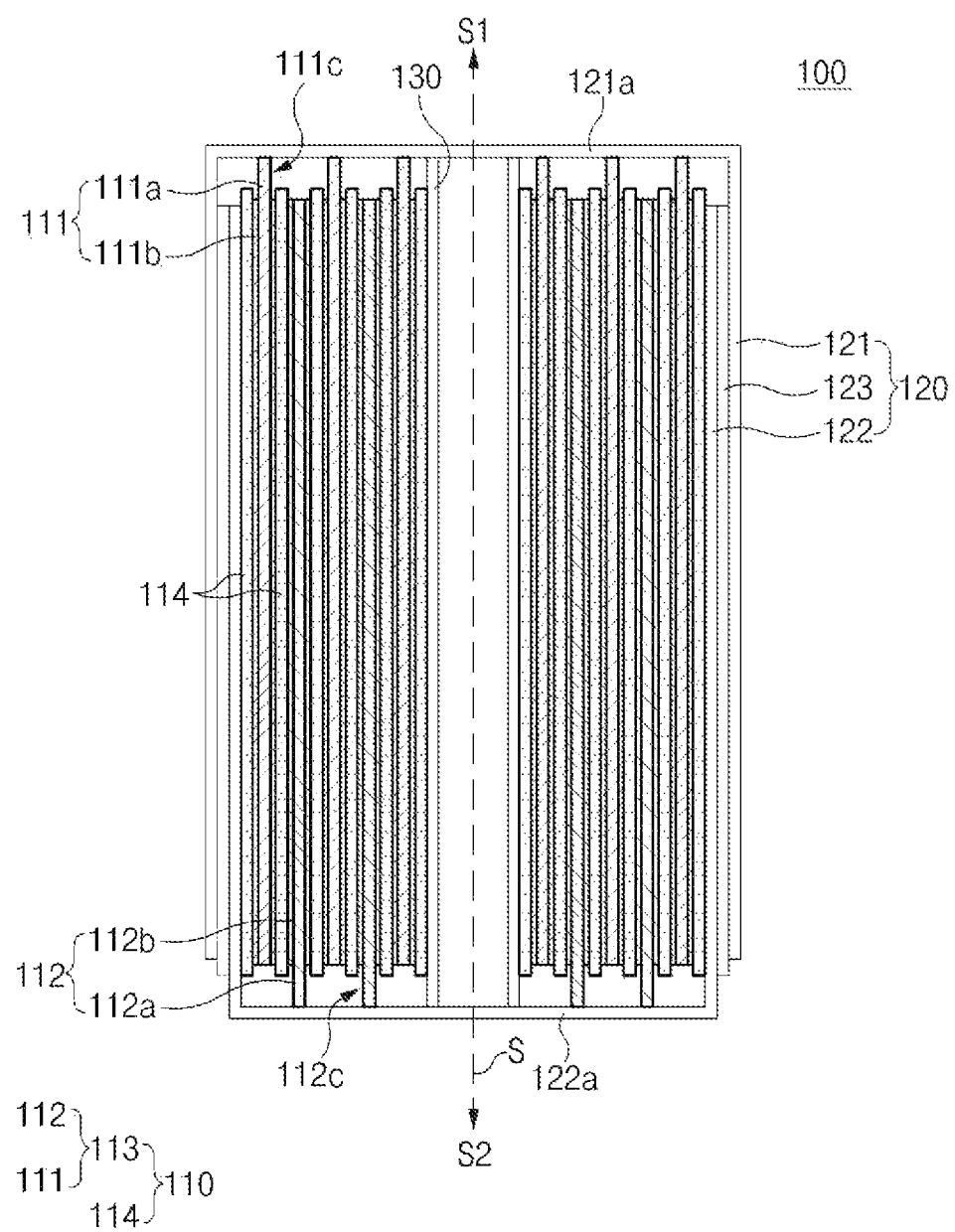
FIG. 2 is a cross-sectional view illustrating an example of the secondary battery according to the first embodiment of the present invention.

FIG. 1 is a perspective view of a secondary battery according to a first embodiment of the present invention, and FIG. 2 is a cross-sectional view illustrating an example of the secondary battery according to the first embodiment of the present invention.

Referring to FIGS. 1 and 2, a secondary battery 100 according to an embodiment of the present invention comprises an electrode assembly 110, a can 120 comprising a first can 121 and a second can 122, which accommodate the electrode assembly 110 therein, and an insulator 123 insulating an overlapping portion between the first can 121 and the second can 122.

Figure 3:
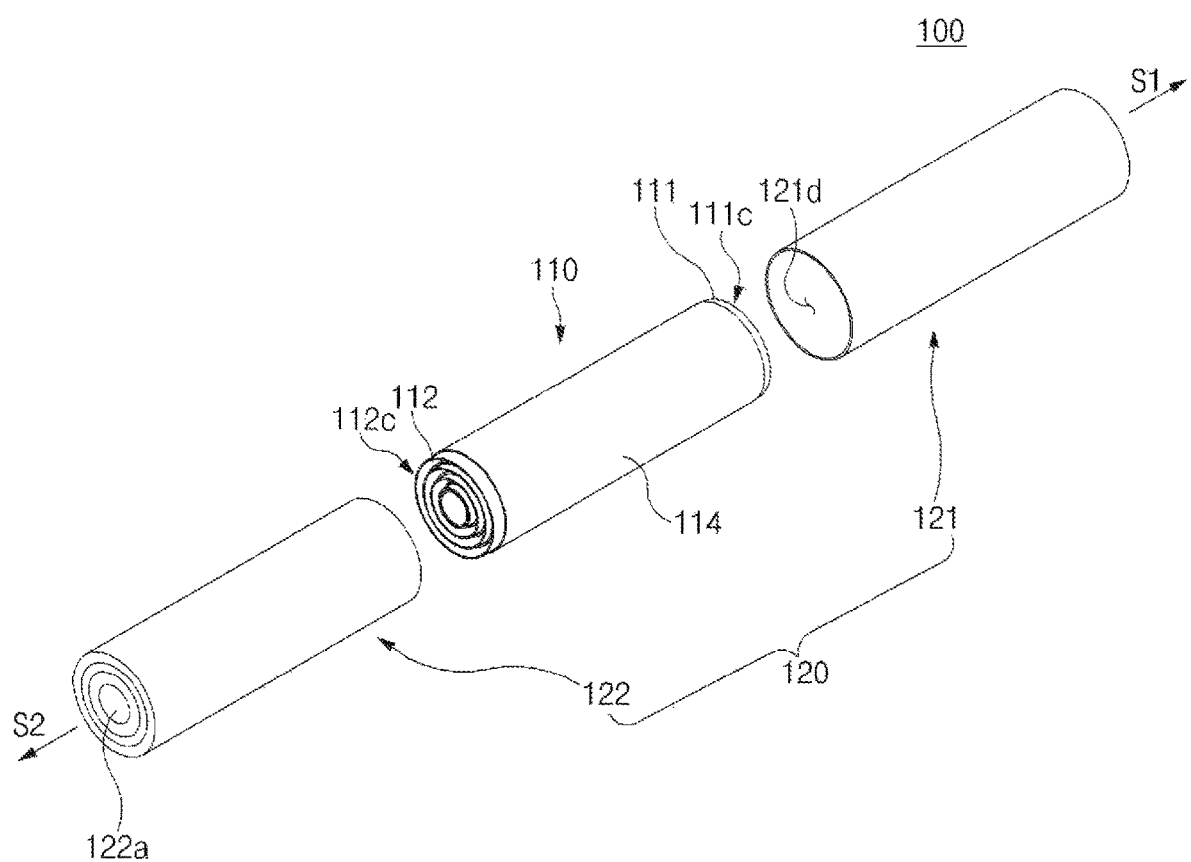
FIG. 3 is an exploded perspective view of the secondary battery according to the first embodiment of the present invention.
Figure 4:
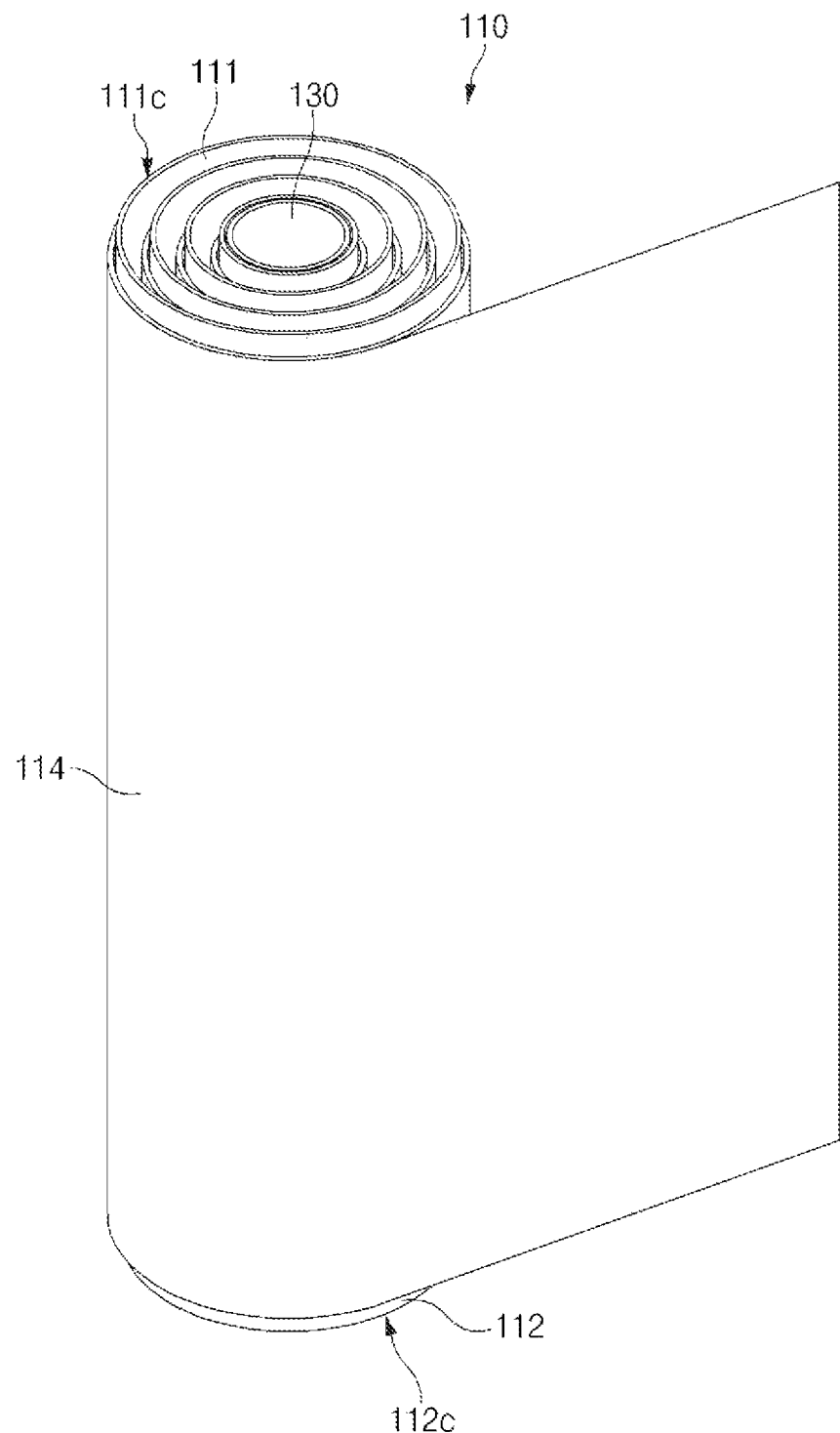
FIG. 4 is a conceptual perspective view of an electrode assembly in the secondary battery according to the first embodiment of the present invention.

FIG. 3 is an exploded perspective view of the secondary battery according to the first embodiment of the present invention, and FIG. 4 is a conceptual perspective view of an electrode assembly in the secondary battery according to the first embodiment of the present invention.

Hereinafter, the secondary battery according to an embodiment of the present invention will be described in more detail with reference to FIGS. 1 to 7.

Referring to FIGS. 2 to 4, the electrode assembly 110 may be a chargeable and dischargeable power generation element and have a structure in which the electrode 113 and the separator 114 are combined and alternately stacked with each other. Here, the electrode assembly 110 may have a wound shape.

The electrode 113 may comprise the first electrode 111 and the second electrode 112. Also, the separator 114 may separate the first electrode 111 from the second electrode 112 to insulate the first and second electrodes 111 and 112 from each other. Here, each of the first electrode 111 and the second electrode may be provided in the form of a sheet and then be wound together with the separator 114 so as to be formed in a jelly roll type. Here, the electrode assembly 110 may be wound, for example, in a cylindrical shape.

Although the first electrode 111 is provided as a positive electrode, and the second electrode 112 is provided as a negative electrode, the present invention is not limited thereto. For example, the first electrode 111 may be provided as a negative electrode, and the second electrode 112 may be provided as a positive electrode.

The first electrode 111 may comprise a first electrode collector 111a and a first electrode active material 111b applied on the first electrode collector 111a. Also, the first electrode 111 may comprise a first electrode non-coating portion 111c that is not coated with the first electrode active material 111b. Here, the first electrode non-coating portion 111c may be disposed on an end of the electrode assembly in one direction S1 to protrude farther than the separator 114 with respect to a direction of a winding center axis S of the electrode assembly 110.

Also, the first electrode 111 may be provided as, for example, a negative electrode and comprise a negative electrode collector (not shown) and a negative electrode active material (not shown) applied on the negative electrode collector. Also, a negative electrode non-coating portion that is not coated with the negative electrode active material may be formed on the first electrode 111.

For example, the negative electrode collector may be provided as foil made of a copper (Cu) or nickel (Ni) material. The negative electrode active material may comprise synthetic graphite, lithium a metal, a lithium alloy, carbon, petroleum coke, activated carbon, graphite, a silicon compound, a tin compound, a titanium compound, or an alloy thereof. Here, the negative electrode active material may further comprise, for example, non-graphite-based SiO (silica) or SiC (silicon carbide).

The second electrode 112 may comprise a second electrode collector 112a and a second electrode active material 112b applied on the second electrode collector 112a. Also, the second electrode 112 may comprise a second electrode non-coating portion 112c that is not coated with the second electrode active material 112b. Here, the second electrode non-coating portion 112c may be disposed on an end of the electrode assembly in the other direction S2 to protrude farther than the separator 14 with respect to the direction of the winding center axis S of the electrode assembly 110.

Here, the second electrode 112 may be provided as, for example, a positive electrode and comprise a positive electrode collector (not shown) and a positive electrode active material (not shown) applied on the positive electrode collector. Also, a positive electrode non-coating portion that is not coated with the positive electrode active material may be formed on the second electrode 112.

For example, the positive electrode collector may be provided as foil made of an aluminum material, and the positive electrode active material may be made of lithium manganese oxide, lithium cobalt oxide, lithium nickel oxide, lithium iron phosphate, or a compound or mixture thereof containing at least one or more of the above-described materials.

The separator 114 may be made of an insulating material, and the first electrode 111, the separator 114, and the second electrode 112 may be alternately stacked. Here, the separator 114 may be disposed between the first electrode 111 and the second electrode on outer surfaces of the first electrode 111 and the second electrode 112. Here, the separator 114 may be disposed at the outermost side in a width direction when the electrode assembly 110 is wound.

Also, the separator 114 may be made of a flexible material. Here, the separator 114 may be made of, for example, a polyolefin-based resin film such as polyethylene or polypropylene having micropores.

The can 120 may be provided with an accommodation part that accommodates the electrode assembly 110 therein and comprise a first can 121 and a second can 122, which have cylindrical shapes opened in a direction facing each other.

Also, the can 120 may be made of a conductive material. Here, the can 120 may comprise a metal. For example, the first can 121 may be made of aluminum, and the second can 122 may be made of steel. For another example, the first can 121 may be made of steel, and the second can 122 may be made of aluminum. Particularly, for example, the can made of aluminum may be connected to the positive electrode, and the can made of steel may be connected to the negative electrode.

Also, the first can 121 may be electrically connected to the first electrode 111, and the second can 122 may be electrically connected to the second electrode 112. Here, the first can 121 may directly contact an end of the first electrode 111 to form a first electrode terminal, and the second can 122 may directly contact an end of the second electrode 112 to form a second electrode terminal.

In one example, when the first electrode is the positive electrode, the first can 121 contacting the end of the first electrode 111 may form the positive electrode terminal. Here, the first can 121 may be made of aluminum. Also, in this case, the second electrode may be the negative electrode, and the second can 122 contacting the end of the second electrode 112 may form the negative electrode terminal. Here, the second can 122 may be made of steel.

Also, the first can 121 and the second can 122 may have shapes corresponding to each other.

Also, the first can 121 and the second can 122 may have cylindrical shapes opened in a direction facing each other. The first can 121 may have an inner circumferential surface greater than an outer circumferential surface of the second can 122 so that the second can is inserted into the first can 121.

The first can 121 may have a first opening 121d opened in one end in the direction S2, and the second can 122 has a second opening (not shown) opened in the other end in the direction S1. In this case, the second connection part 122a disposed in the direction S2 of the second can 122 may be disposed outside the first can 121 even after the second can 122 is inserted into the first can 121.

Furthermore, the first electrode 111 may have one end connected to the first connection part 121a, and the second electrode 122 may have one end connected to the second connection part 122a. Here, for example, the first electrode non-coating portion 111c of the first electrode 111 may directly contact the first connection part 121a, and the second electrode non-coating portion 112c of the second electrode 112 may directly contact the second portion 122a.

Figure 5:
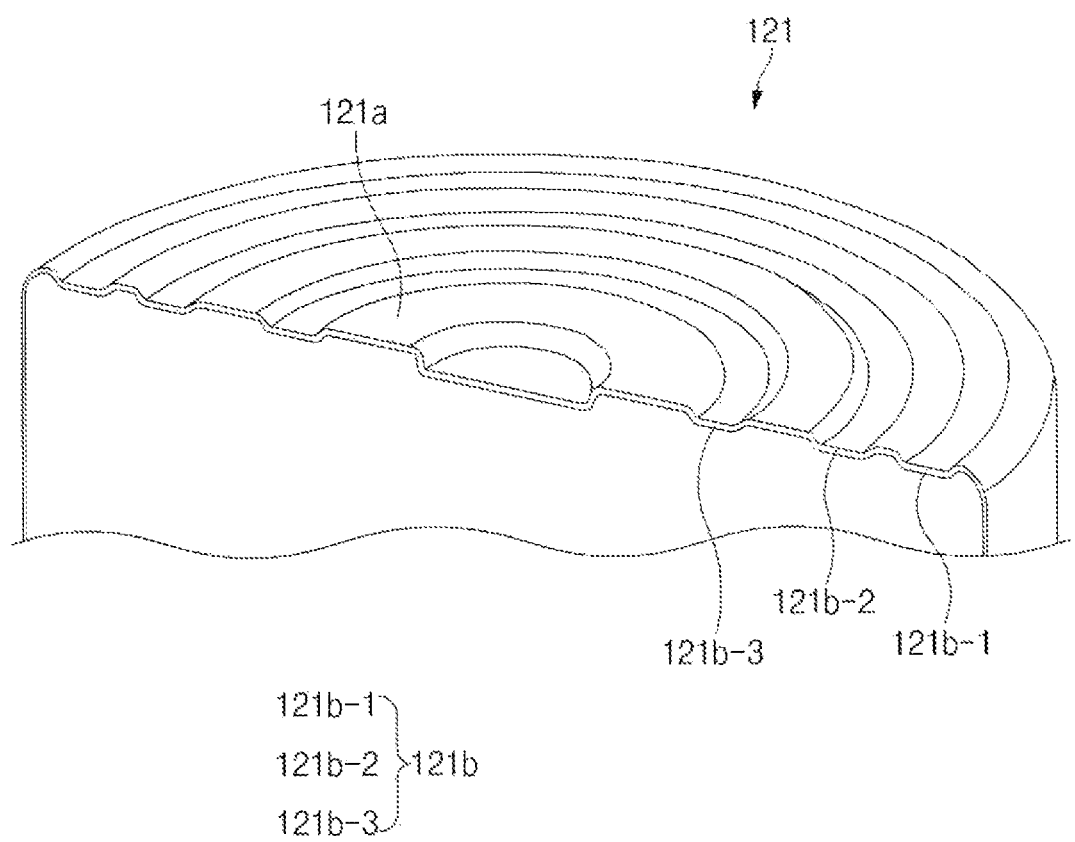
FIG. 5 is a cutaway perspective view illustrating a portion of a first can in the secondary battery according to the first embodiment of the present invention.
Figure 6:
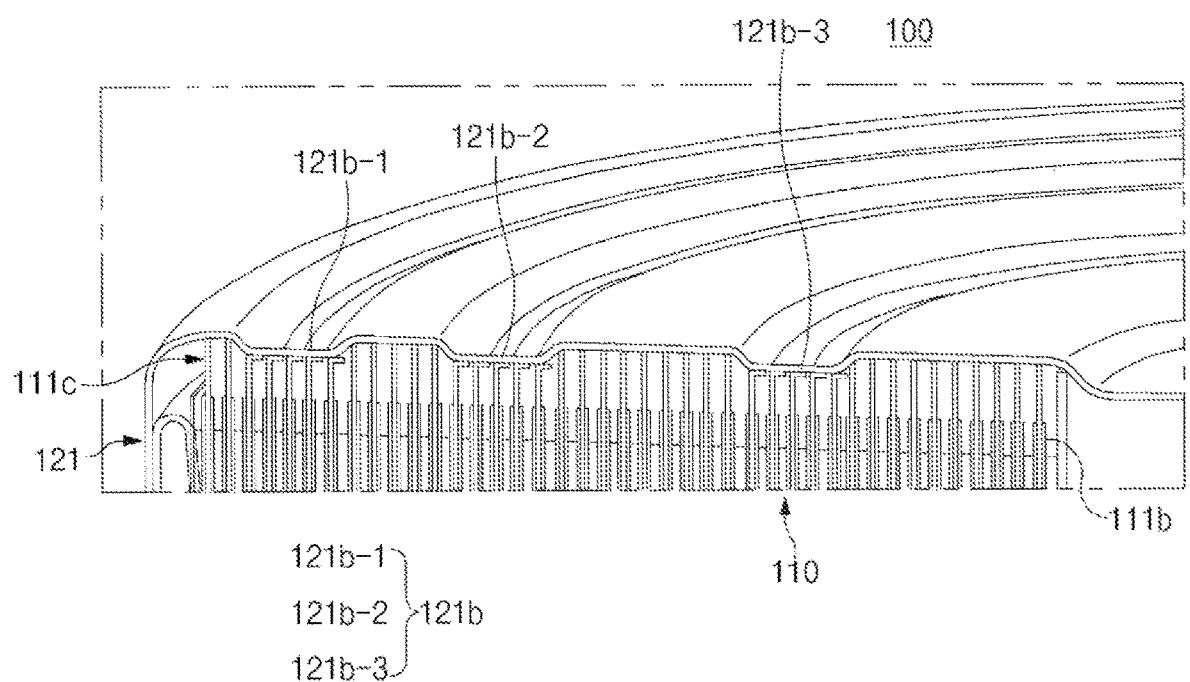
FIG. 6 is an enlarged cutaway perspective view illustrating a portion of the secondary battery according to the first embodiment of the present invention.

FIG. 5 is a cutaway perspective view illustrating a portion of the first can in the secondary battery according to the first embodiment of the present invention, and FIG. 6 is an enlarged cutaway perspective view illustrating a portion of the secondary battery according to the first embodiment of the present invention.

Referring to FIGS. 2, 5, and 6, for example, the protrusion connection part may be formed on at least one of the first connection part 121a or the second connection part 122a to protrude in the direction of the electrode assembly 110.

In more detail, a first protrusion connection part 121b protruding in the direction of the electrode assembly 110 may be disposed on the first connection part 121a of the first can 121, and thus, the first electrode non-coating portion 111c may be connected to the first protrusion connection part 121b. Also, a second protrusion connection part (not shown) protruding in the direction of the electrode assembly 110 may be disposed on the second connection part 122a, and the second electrode non-coating portion 112c may be connected to the second protrusion connection part. Here, the second protrusion connection part may have a shape corresponding to that of the first protrusion connection part 121b.

Also, each of the first protrusion connection part 121b and the second protrusion connection part may have a shape that is bent and recessed in the direction of the electrode assembly 110. A concave portion is formed in an outer surface of the first can 121, and a convex portion may be formed on an inner surface of the first can 121.

Furthermore, the first electrode non-coating portion 111c may be welded and fixed to the first protrusion connection part 121b, and the second electrode non-coating portion 112c may be welded and fixed to the second protrusion connection part.

Also, the first protrusion connection part 121b may be formed on the first connection part 121a in the form of a plurality of circles having different diameters in the plan view, with a first protrusion 121b-1, a second protrusion 121b-2, and a third protrusion 121b-3 being sequentially formed from an outer portion of the first connection part 121a towards a central direction.

The second protrusion connection part (not shown) having a shape corresponding to that of the first protrusion connection part 121b formed on the first connection part 121a of the first can 121 may also be formed on the second connection part of the second can 122. Here, the second electrode non-coating portion 112c of the second electrode 112 may be welded and connected to the second protrusion connection part formed on the second connection part 122a.

Referring to FIG. 2, the insulator 123 may comprise an insulating material to insulate an overlapping portion between the first can 121 and the second can 122.

Furthermore, the insulator 123 may comprise an insulating polymer. In this case, the insulating polymer may be, for example, a polymer.

Referring to FIGS. 2 and 6, in the secondary battery 100 having the above-described configuration according to an embodiment of the present invention, the first electrode 111 and the second electrode 112 of the wound electrode assembly 110 may be directly connected to the first can 121 and the second can 122 without a connection member, thereby minimizing resistance and improving heat dissipation characteristics. Also, the protrusion connection part protruding in the direction of the electrode assembly 110 may be formed on the can 120 so that the first electrode non-coating portion 111c and the second electrode non-coating portion 112c of the wound electrode assembly 110 may be welded to the first can 121 and the second can 122 regardless of meandering of the wound first and second electrodes 111 and 112 (the meandering means that the electrode was not uniformly rolled but rather rolled so as to be inclined when being wound). That is, the meandering may occur somewhat when the electrode is wound. If the meandering occurs, when the electrode non-coating portion is welded to the can, a portion at which the electrode non-coating portion does not contact the can may occur. According to the present invention, since the protrusion connection part is formed on the can, even when the meandering partially occurs during the winding of the electrode, the electrode non-coating portion and the can may well contact each other. Thus, sufficient welding may be possible. FIG. 6 illustrates a state in which the first electrode non-coating portion is bent at the portion at which the protrusion connection portion is formed so as to well contact the inner surface of the can.

Hereinafter, a secondary battery according to another embodiment will be described.

Figure 7:
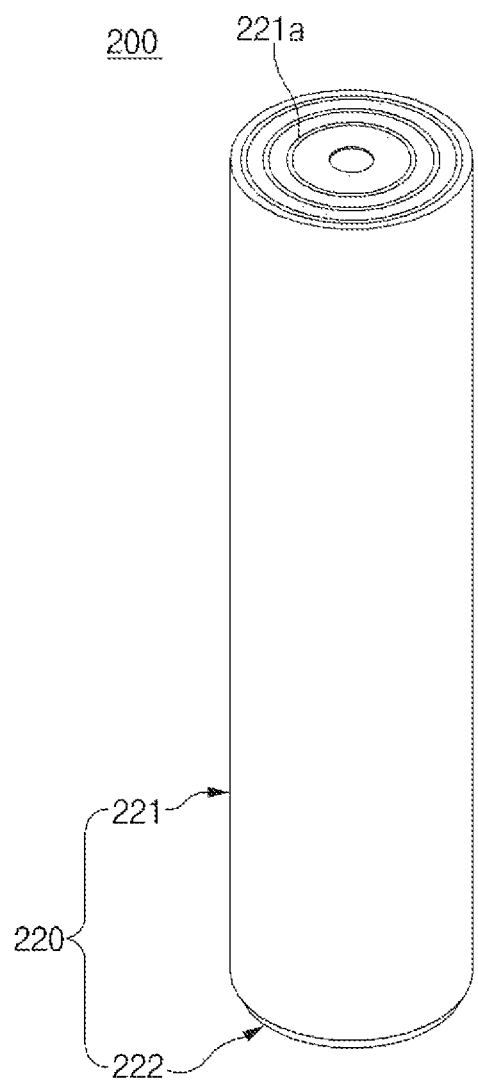
FIG. 7 is a perspective view of a secondary battery according to a second embodiment of the present invention.
Figure 8:
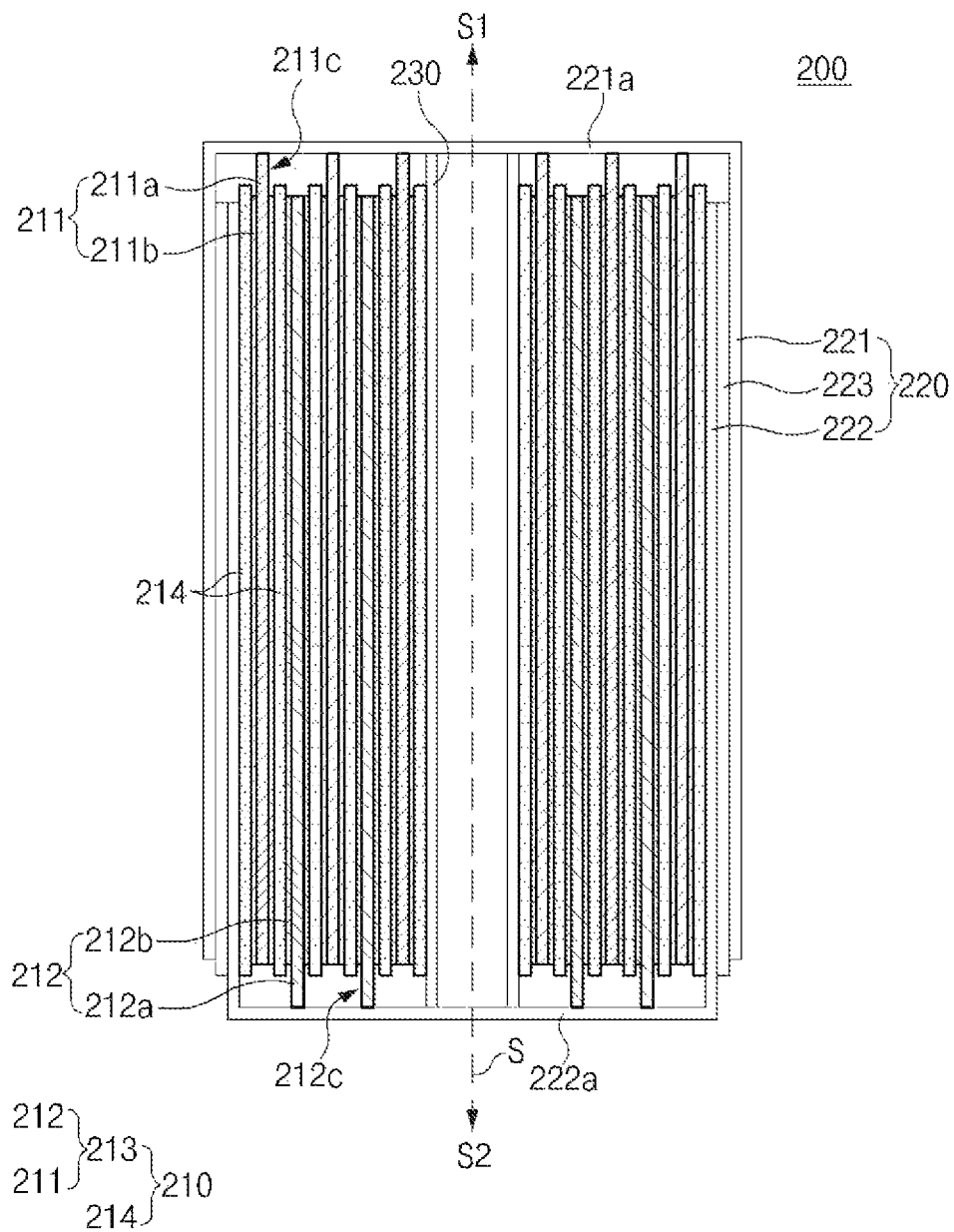
FIG. 8 is a cross-sectional view illustrating an example of the secondary battery according to the second embodiment of the present invention.

FIG. 7 is a perspective view of a secondary battery according to a second embodiment of the present invention, and FIG. 8 is a cross-sectional view illustrating an example of the secondary battery according to the second embodiment of the present invention.

Referring to FIGS. 7 and 8, a secondary battery 200 according to another embodiment of the present invention comprises an electrode assembly 210, a can 220 comprising a first can 221 and a second can 222, which accommodate the electrode assembly 210 therein, and an insulator 223 insulating an overlapping portion between the first can 221 and the second can 222.

The secondary battery 200 according to another embodiment of the present invention is different from the secondary battery according to the foregoing embodiment in that matters for a welding pattern configuration for welding between the can 220 and the electrode 213 are further provided. Thus, contents of this embodiment, which are duplicated with those according to the forgoing embodiment, will be briefly described, and also, differences therebetween will be mainly described.

Figure 9:
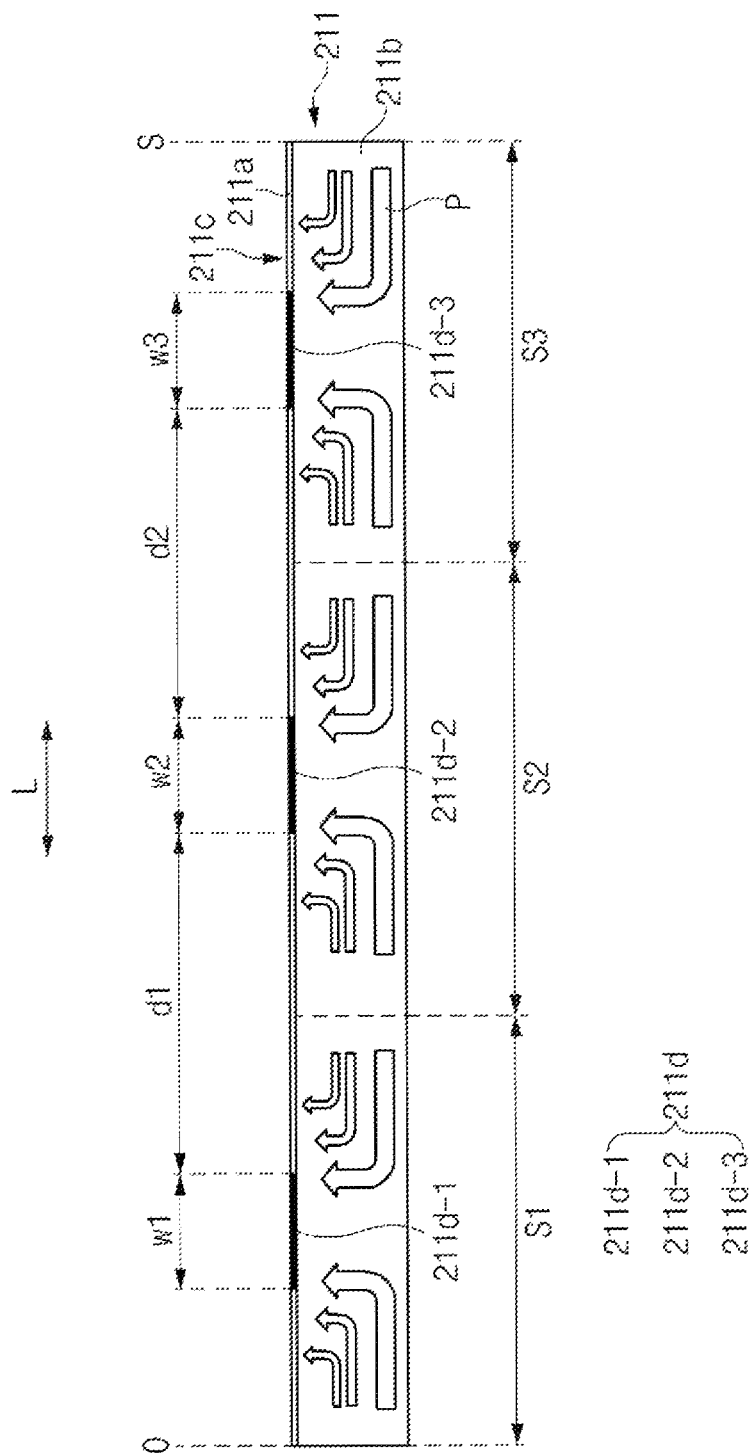
FIG. 9 is a plan view illustrating an example of a state in which a first electrode is spread before being wound in the secondary battery according to the second embodiment of the present invention.

FIG. 9 is a plan view illustrating an example of a state in which the first electrode is spread before being wound in the secondary battery according to the second embodiment of the present invention.

In more detail, referring to FIGS. 8 and 9, in the secondary battery 200 according to another embodiment of the present invention, the electrode assembly 210 forms a structure in which the electrodes 213 and a separator 214 are alternately stacked. Here, the electrode assembly 210 may have a wound shape.

The electrode 213 may comprise the first electrode 211 and the second electrode 212.

The first electrode 211 may comprise a first electrode collector 211a and a first electrode active material 211b applied on the first electrode collector 211a. Also, the first electrode 211 may comprises a first electrode non-coating portion 211c that is not coated with the first electrode active material 211b.

The second electrode 212 may comprise a second electrode collector 212a and a second electrode active material 212b applied on the second electrode collector 212a. Also, the second electrode 212 may comprises a second electrode non-coating portion 212c that is not coated with the second electrode active material 212b.

Figure 10:
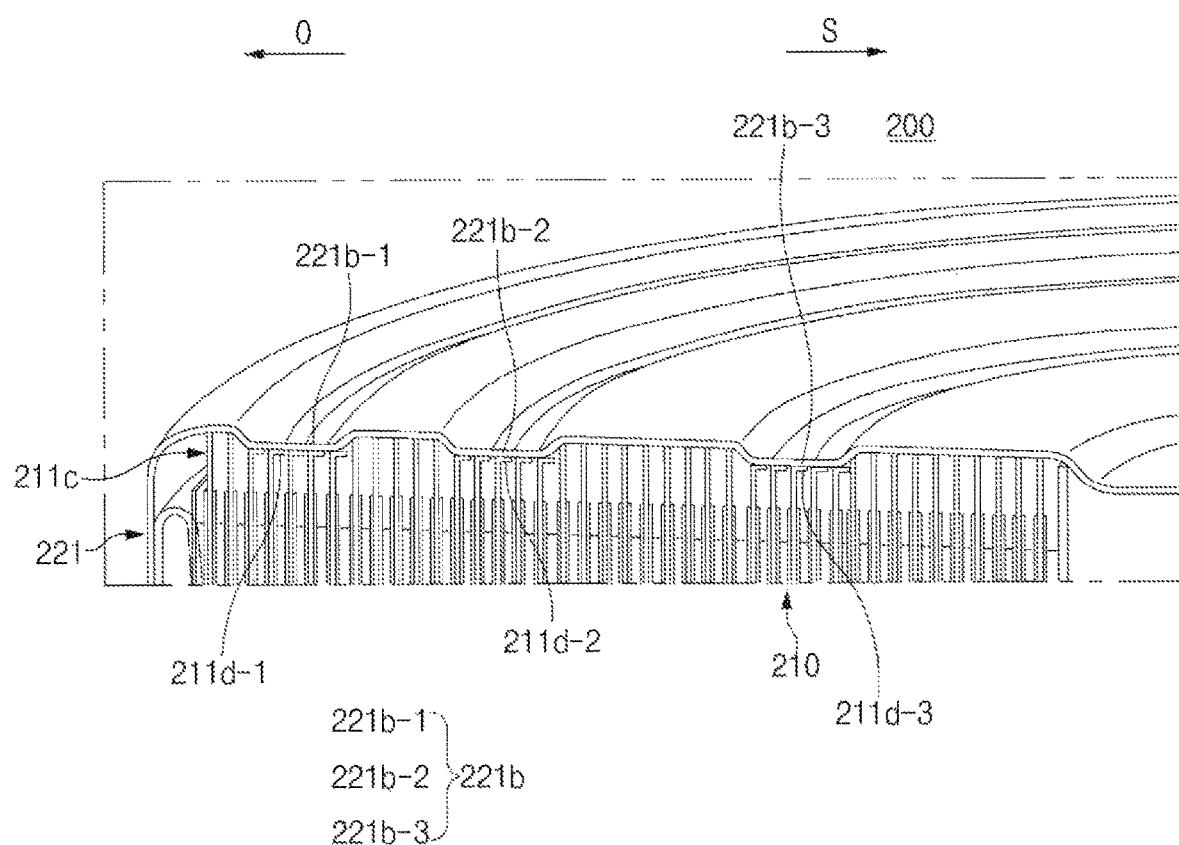
FIG. 10 is an enlarged cutaway perspective view illustrating a portion of the secondary battery according to the second embodiment of the present invention.
Figure 11:
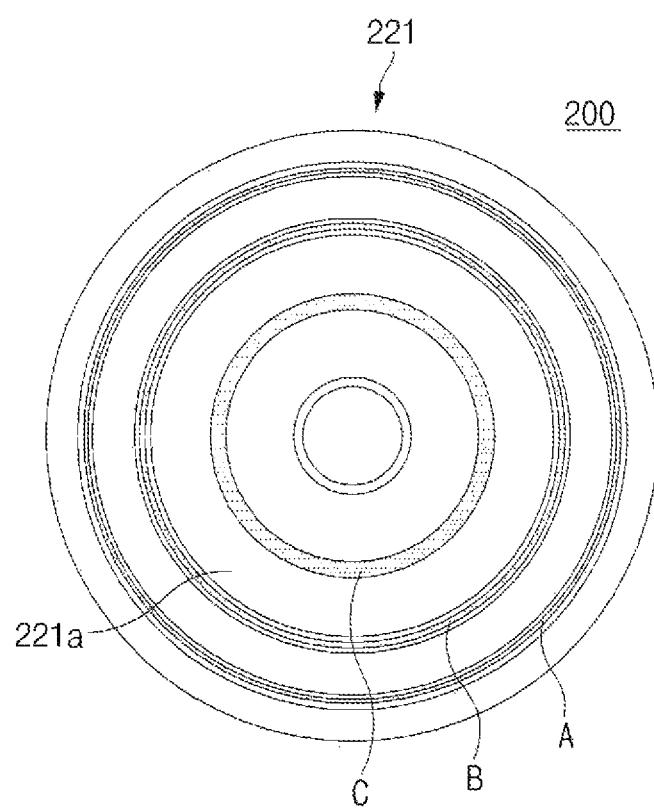
FIG. 11 is a plan view of the secondary battery according to the second embodiment of the present invention.
Figure 12:
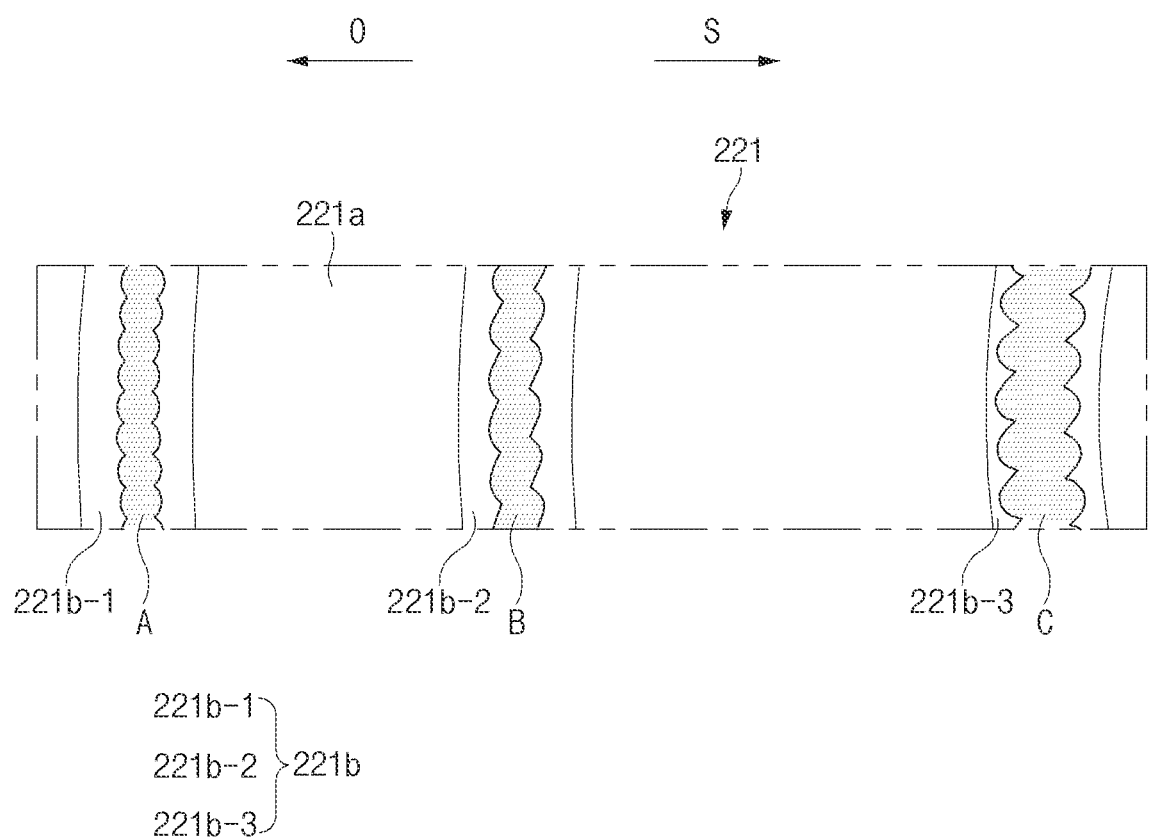
FIG. 12 is a plan view illustrating a portion of a first can in the secondary battery according to the second embodiment of the present invention.
Figure 13:
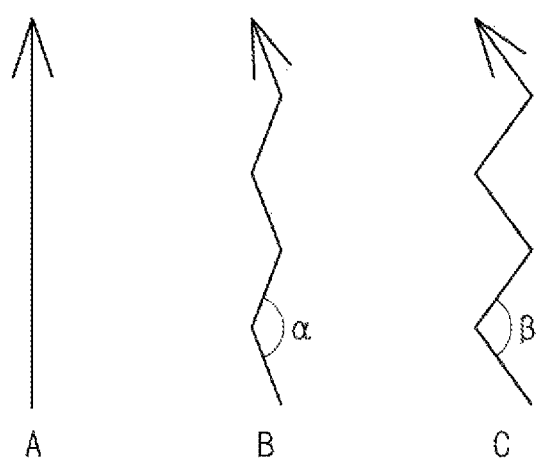
FIG. 13 is a conceptual view illustrating an example of a welding pattern in the secondary battery according to the second embodiment of the present invention.

FIG. 10 is an enlarged cutaway perspective view illustrating a portion of the secondary battery according to the second embodiment of the present invention, and FIG. 11 is a plan view of the secondary battery according to the second embodiment of the present invention. Also, FIG. 12 is a plan view illustrating a portion of a first case in the secondary battery according to the second embodiment of the present invention, and FIG. 13 is a conceptual view illustrating an example of a welding pattern in the secondary battery according to the second embodiment of the present invention.

Referring to FIGS. 8 and 10, the can 220 may be provided with an accommodation part that accommodates the electrode assembly 210 therein and comprises a first can 221 and a second can 222, which have cylindrical shapes opened in a direction facing each other.

Here, the first can 221 may be electrically connected to the first electrode 211, and the second can 222 may be electrically connected to the second electrode 212.

A first protrusion connection part 221b protruding in a direction of the electrode assembly 210 may be disposed on a first connection part 221a of the first can 221, and thus, the first electrode non-coating portion 211c may be connected to the first protrusion connection part 221b. Also, a second protrusion connection part (not shown) protruding in the direction of the electrode assembly 210 may be disposed on the second connection part 222a, and the second electrode non-coating portion 212c may be connected to the second protrusion connection part.

Each of the first protrusion connection part 221b and the second protrusion connection part may have a shape that is bent and recessed in the direction of the electrode assembly 210. A concave portion is formed in an outer surface of the first can 221, and a convex portion may be formed on an inner surface of the first can 221.

The first electrode non-coating portion 211c may be welded and fixed to the first protrusion connection portion 221b, and the second electrode non-coating portion 212c may be welded and fixed to the second protrusion connection portion.

Referring to FIGS. 9 to 11, the first protrusion connection part 221b are formed on the first connection part 221a in the form of a plurality of circles having different diameters in the plan view, with a first protrusion 221b-1, a second protrusion 221b-2, and a third protrusion 221b-3 being sequentially formed from an outer portion O of the first connection part 221a towards a direction of a winding center portion S.

Also, a distance between the first protrusion 221b-1 and the second protrusion 221b-2 may be less than a distance between the second protrusion 221b-2 and the third protrusion 221b-3.

Here, three portions of a first electrode connection part 211d, which are spaced a predetermined distance from each other on the first electrode non-coating portion 211c in a longitudinal direction L of the first electrode 211, may be connected to the first protrusion 221b-1, the second protrusion 221b-2, and the third protrusion 221b-3, respectively. Particularly, the first electrode connection part 211d may comprise a first welding portion 211d-1, a second welding portion 211d-2, and a third welding portion 211d-3, which are three portions spaced a predetermined distance from each other in the longitudinal direction L, and the first welding portion 211d-1, the second welding portion 211d-2, and the third welding portion 211d-3 may be connected to the first protrusion 221b-1, the second protrusion 221b-2, and the third protrusion 221b-3, respectively.

Also, when the first electrode connection part 211d is wound in the longitudinal direction L of the first electrode 211, the first welding portion 211d-1, the second welding portion 211d-2, and the third welding portion 211d-3 may be sequentially disposed from an outer portion O of the first electrode 211 towards the winding center portion S of the first electrode 211 so as to be respectively welded and fixed to the first protrusion 221b-1, the second protrusion 221b-2, and the third protrusion 221b-3.

Also, a moving path P of charges and heat in the first electrode 211 may be directed toward the first welding portion 211d-1, the second welding portion 211d-2, and the third welding portion 211d-3. Here, the first electrode 211 in the longitudinal direction L may have, for example, a length of 3,780 mm. Here, for example, the welded portion of the first welding portion 211d-1 and the first protrusion 221b-1 may be disposed at a position of the wound electrode assembly 110, which is spaced a distance of 10.3 mm from the winding center portion S, in the plan view; the welded portion of the second welding portion 211d-2 and the second protrusion 221b-2 is disposed at a position of the wound electrode assembly 110, which is spaced a distance of 16.7 mm from the winding center portion S, in the plan view; and the welded portion of the third welding portion 211d-3 and the third protrusion 221b-3 may be disposed at a position of the wound electrode assembly 110, which is spaced a distance of 21.3 mm from the winding center portion S, in the plan view.

Furthermore, the first electrode 211 may comprise a first section S1, a second section S2, and a third section S3, which are equally divided into three sections in the longitudinal direction L of the first electrode 211, and the first welding portion 211d-1, the second welding portion 211d-2, and the third welding portion 211d-3 may be disposed at central portions of the first section S1, the second section S2, and the third section S3, respectively. For example, the first section S1, the second section S2, and the third section S3 may have the same length of 1260 mm.

Referring to FIG. 9, which illustrates a spread state of the first electrode 211 before being wound, a distance d1 between the first welding portion 211d-1 and the second welding portion 211d-2 may be the same as a distance d2 between the second welding portion 211d-2 and the third welding portion 211d-3. Here, a welding length w1 of the first welding portion 211d-1, a welding length w2 of the second welding portion 211d-2, and a welding length w3 of the third welding portion 211d-3 may be the same. Here, the welding length w1 of the first welding portion 211d-1, the welding length w2 of the second welding portion 211d-2, and the welding length w3 of the third welding portion 211d-3 may be the same, for example, 200 mm to 300 mm.

When equally formed as described above, charges may be balanced and smoothly move, or heat may be balanced and smoothly transferred.

Referring to FIGS. 9 to 13, a welding pattern A of the first welding portion 211d-1 and the first protrusion 221b-1 may be formed in a straight shape, a welding pattern B of the second welding portion 211d-2 and the second protrusion 221b-2 may be formed in a zigzag shape, a welding pattern C of the third welding portion 211d-3 and the third protrusion 221b-3 may be formed in a zigzag shape having a width greater than that of the zigzag-shaped welding pattern B of the second welding portion 211d-2 and the second protrusion 221b-2. For reference, referring to FIGS. 12 and 13, which illustrate partial enlarged views, although the welding patterns A, B, and C have the straight shape and the zigzag shape, the present invention is not limited thereto. For example, referring to FIG. 11, which illustrates an entire plan view, the welding patterns A, B, and C may have a circular shape as a whole. That is, the welding pattern A may form a circle in the straight shape, and the welding pattern B and the welding pattern C may form a circle in the zigzag shape.

As a result, the first welding portion 211d-1, the second welding portion 211d-2, and the third welding portion 211d-3 of the first electrode connection part 211d may be fixed with a uniform welding area to the first protrusion 221b-1, the second protrusion 221b-2, and the third protrusion 221b-3 of the first protrusion connection part, respectively. Thus, the uniform welding area may be provided to prevent electrode resistance and thermal deviation from occurring.

In more detail, in the plan view of the first connection part 221a, the welding pattern A of the first welding portion 211d-1 and the first protrusion 221b-1 may be disposed on the outer portion O to form the largest circle, the welding pattern B of the second welding portion 211d-2 and the second protrusion 221b-2 may form a circle smaller than the circle formed by the first welding portion 211d-1 and the first protrusion 221b-1, and the welding pattern C of the third welding portion 211d-3 and the third protrusion 221b-3 may be disposed at the winding center portion S in the plane to form the smallest circle. As a result, the lengths of the welding pattern may be different from each other. Thus, the widths of the welding patterns may be differently provided to correspond to the different lengths so that the uniform welding area is provided to prevent electrode resistance and thermal deviation from occurring due to the non-uniform welding areas.

For reference, although the welding length w1 of the first welding portion 211d-1, the welding length w2 of the second welding portion 211d-2, and the welding length w3 of the third welding portion 211d-3 are the same in the first electrode 211, if the first welding portion 211d-1 is disposed at the outermost side, for example, wound once when the first electrode 211 is wound, the second welding portion 211d-2 may be wound twice, and the third welding portion 211d-3 may be wound three times. Here, when the second welding portion 211d-2 and the third welding portion 211d-3 are welded by a width of one layer of the first welding portion 211d-1, which is wound once, the welding area may be non-uniform. Thus, when the second welding portion 211d-2 is welded, the width of the welding pattern B has to be formed to be wider than the width of the welding pattern A when the first welding portion 211d-1 is welded so that the first welding portion 211d-1 and the second welding portion 211d-2 actually have the same welding area. For this purpose, the width of the welding pattern C for welding the third welding portion 211d-3 may be wider than the welding pattern B for welding the second welding portion 211d-2 to provide a uniform welding area, thereby preventing the electrode resistance and the thermal deviation from occurring.

For example, the welding pattern C of the third welding portion 211d-3 and the third protrusion 221b-3 may have a zigzag shape having a width that is twice or more than that of the welding pattern B of the second welding portion 211d-2 and the second protrusion 221b-2.

For example, the zigzag-shaped welding pattern B of the second welding portion 211d-2 and the second protrusion 221b-2 may have an angle α of 120° to 140°, which is bent in the zigzag shape, and the zigzag-shaped welding pattern C of the third welding portion 211d-3 and the third protrusion 221b-3 may have an angle β of 80° to 100°, which is bent in the zigzag shape. As a result, if the numerical limitation conditions of the welding pattern are satisfied, the first welding portion 211d-1, the second welding portion 211d-2, and the third welding portion 211d-3 may be welded with a uniform welding area to the first protrusion 221b-1, the second protrusion 221b-2, and the third protrusion 221b-3 of the first protrusion connection part 221b, respectively.

The second protrusion connection part (not shown) having a shape corresponding to that of the first protrusion connection part 221b formed on the first connection part 221a of the first can 221 may also be formed on the second connection part of the second can 222. Here, the second electrode support portion 212c of the second electrode 212 may be welded and connected to the second protrusion formed on the second connection part 222a with the same welding pattern as the shape in which the first electrode non-coating portion 211c of the first electrode 211 is welded to the first protrusion connection part 221b.

Referring to FIGS. 8, 10, and 12, in the secondary battery 200 having the configuration as described above according to the second embodiment of the present invention, the welding position and the welding pattern between the first and second cans 221 and 222 and the first and second electrode non-coating portions 211*c* and 212*c* may be uniform to improve the electrode resistance and the thermal deviation.

While the present invention has been particularly shown and described with reference to exemplary embodiments thereof, it is to be understood that the scope of the present invention is not limited to the secondary battery according to such exemplary embodiments. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A secondary battery comprising:
   an electrode assembly including a first electrode, a separator, and a second electrode alternately stacked and wound about a central axis, the first electrode having a first non-coated portion protruding farther than the separator in a first direction along the central axis, and the second electrode having a second non-coated portion protruding farther than the separator in a second direction along the central axis, the second direction being opposite the first direction along the central axis, and the first and second non-coated portions not being coated with an electrode active material; and
   a can configured to accommodate the electrode assembly, the can including a first can and a second can,
   wherein the first non-coated portion of the first electrode contacts a first connection part disposed on a first end of the first can, and the second non-coated portion of the second electrode contacts a second connection part disposed on a first end of the second can, and
   wherein at least one of the first connection part or the second connection part comprises a protrusion having a shape protruding towards the electrode assembly, wherein the protrusion is integral with at least one of the first can or the second can.

2. The secondary battery of claim 1, wherein the first connection part includes a first protrusion protruding towards the electrode assembly to allow the first non-coated portion to be connected to the first protrusion, and
   wherein the second connection part includes a second protrusion protruding towards the electrode assembly to allow the second non-coated portion to be connected to the second protrusion.

3. The secondary battery of claim 2, wherein each of the first protrusion and the second protrusion has a shape that is bent so as to be recessed into the first end of the respective first and second can in a direction towards the electrode assembly, and
   wherein the first protrusion and the second protrusion each define a concave portion formed in an outer surface of the can and a convex portion formed on an inner surface of the can.

4. The secondary battery of claim 3, wherein the first non-coated portion is welded and fixed to the first protrusion, and
   wherein the second non-coated portion is welded and fixed to the second protrusion.

5. The secondary battery of claim 4, wherein the first protrusion of the first connection part defines a plurality of annular protrusions each having a different diameter transverse to the central axis, and
   the plurality of annular protrusions including a first annular protrusion, a second annular protrusion, and a third annular protrusion concentrically arranged on the first connection part.

6. The secondary battery of claim 5, wherein the non-coated portion of the first electrode includes a first welding portion, a second welding portion, and a third welding portion spaced a predetermined distance from each other along a longitudinal direction of the first electrode, the first, second, and third welding portions being connected to the first, second, and third protrusions, respectively.

7. The secondary battery of claim 6, wherein, when the first electrode is wound about the central axis, the first, second, and third welding portions are arranged sequentially from an outer portion of the first electrode towards the central axis so as to be welded and fixed to the respective first, second, and third protrusions.

8. The secondary battery of claim 7, wherein a welding pattern between the first welding portion and the first protrusion is formed in a straight shape, a welding pattern between the second welding portion and the second protrusion is formed in a first zigzag shape, and a welding pattern between the third welding portion and the third protrusion is formed in a second zigzag shape, the second zigzag shape having a width greater than that of the first zigzag shape.

9. The secondary battery of claim 8, wherein the width of the second zigzag shape is at least twice that of the first zigzag shape.

10. The secondary battery of claim 8, wherein interior angles defined by the first zigzag shape have a magnitude of 120° to 140°, and
    wherein interior angles defined by the second zigzag shape have a magnitude of 80° to 100°.

11. The secondary battery of claim 7, wherein a distance between the first annular protrusion and the second annular protrusion is less than that between the second annular protrusion and the third annular protrusion.

12. The secondary battery of claim 7, wherein a portion of the first electrode along the longitudinal direction is equally divided into a first section, a second section, and a third section, and
    wherein the first welding portion, the second welding portion, and the third welding portion are each disposed at a central portion of the respective first section, second section, and third section.

13. The secondary battery of claim 1, wherein the first can and the second can each have a cylindrical shape open in a direction facing towards the other, and
    wherein the first can has an inner circumference greater than an outer circumference of the second can so that the second can is received in the first can.

14. The secondary battery of claim 13, wherein the first can has a second end having a first opening open in the second direction, and
    wherein the second can has a second end having a second opening open in the first direction, the second end of each of the first and second cans being opposite to the respective first end along the central axis.

15. The secondary battery of claim 14, wherein the second connection part is disposed outside the first can when the second can is received in the first can.

16. The secondary battery of claim 1, wherein an outer surface of the first can or the second can includes a concave feature at a location corresponding to the protrusion.

* * * * *